C. C. CLARK.
VEHICLE REACH.
APPLICATION FILED MAY 7, 1909.
934,595.
Patented Sept. 21, 1909.
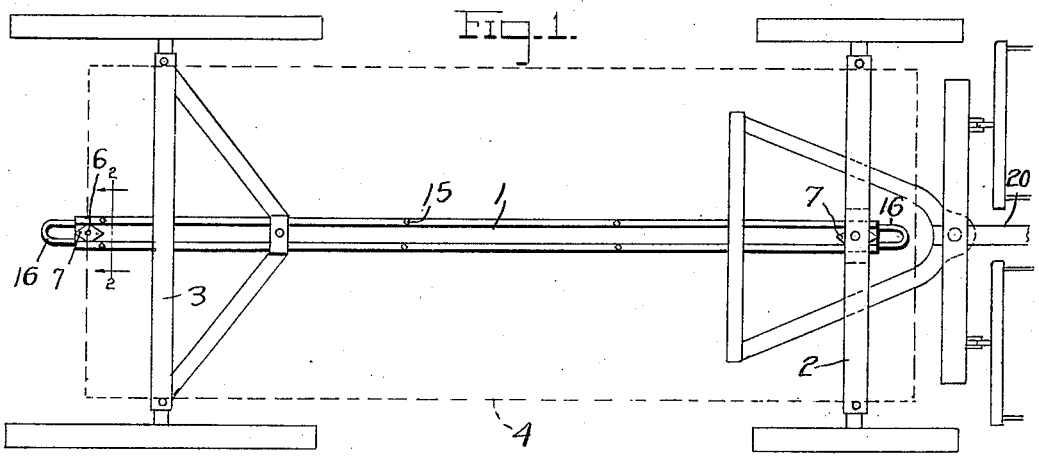
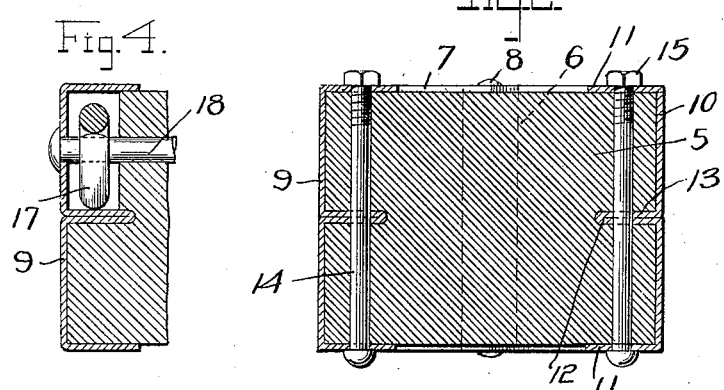
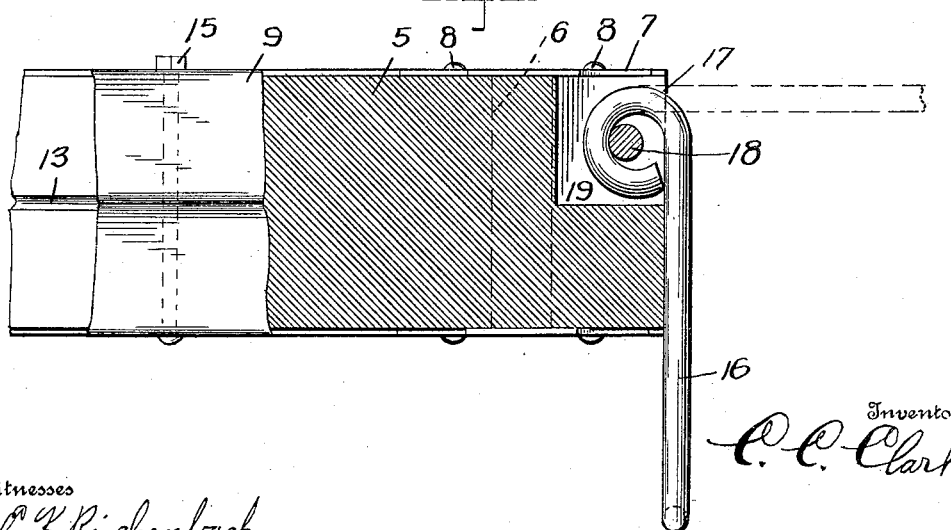
Witnesses
C. H. Reichenbach
T. K. Bryant
Inventor
C. C. Clark
By H. C. Evert & Co., Attorneys

UNITED STATES PATENT OFFICE.

CYRUS C. CLARK, OF STOUGHTON, WISCONSIN.

VEHICLE-REACH.

934,595.  Specification of Letters Patent.  Patented Sept. 21, 1909.

Application filed May 7, 1909. Serial No. 494,545.

*To all whom it may concern:*

Be it known that I, CYRUS C. CLARK, a citizen of the United States of America, residing at Stoughton, in the county of Dane and State of Wisconsin, have invented certain new and useful Improvements in Vehicle-Reaches, of which the following is a specification, reference being had therein to the accompanying drawing.

This invention relates to improvements in vehicle reaches and is more especially designed for use in connection with draft wagons.

The primary object of this invention is the provision of a reach which provides, while taking the place of an ordinary reach bar, a means whereby a trailer vehicle may be hitched directly to the leader team.

A further object is the provision of a wagon reach which is reversible, each end thereof being provided with identical attaching means and also one that is primarily constructed of wood having metallic reinforcing members whereby the amount of wood employed may be decreased while the strength of the reach is materially increased.

A still further object is to provide a reach which is simple in construction, light in weight, and may be easily and cheaply manufactured while at the same time being highly efficient in carrying out the above objects.

With these objects in view and others that will be seen as the nature of the invention is better understood, my device consists in the novel arrangement, construction and combination of parts hereinafter fully set forth, illustrated in the accompanying drawings and pointed out in the appended claims.

In the drawings forming a part of this application and in which like numerals designate similar parts throughout the several views, Figure 1 is a plan view of the device shown in actual use in a vehicle, Fig. 2 is a cross-section of my invention taken upon line 2—2 of Fig. 1, Fig. 3 is a view of the device, partly broken away, showing details of construction, and Fig. 4 is an end view of the reach bar.

Referring more specifically to the drawings, the reach 1 is positioned in the usual manner through wagon gear plates in connection with the front axle 2 and rear axle 3 of the vehicle, the body or box thereof 4 illustrated in dotted lines.

The main portion of my wagon reach consists of the substantially rectangular wooden bar 5 of the desired length and has at each end thereof the usual kingbolt eye 6, which is protected on both sides of the reach by a washer 7 secured to said wooden portion as by pins 8, and the extreme point of said washer may be overturned on the end of the reach for further positioning the same.

The two opposite sides on the reach bar are reinforced by metallic plates 9 and 10 oppositely-arranged and completely inclosing and protecting said sides of the wooden portion 5. Said plates 9 and 10 are preferably constructed of sheet metal and as here illustrated are in the form of double channel bars having the end walls 11 and the central or intermediate wall 12, which latter wall is provided by bending said metal backward upon itself thus providing this wall of double the thickness of said end walls. It is obvious that said plates 9 and 10 may be constructed of cast or other metal integral in one piece.

The opposite sides of the wooden reach member 5 are provided through the center thereof and extending from end to end with alining slots 13 adapted for the reception of the metal wall 12 of the reinforcing plates.

The plates 9 and 10 are applied as plainly shown in Figs. 2 and 3 with opposite end walls 10 and 11 thereof embracing the top and bottom of the reach while the central parallel wall 12 is firmly embedded in said slot 13; alining perforations are provided through said three walls of the reinforcing members for the reception of retaining bolts 14 passing through the wooden member 5 and being suitably headed at one end and provided with tightening members 15 at the opposite end thereof thus securely positioning the metal plates upon the reach bar.

At each end of the reach is provided a swinging coupler clevis 16 which is pivoted by the rings 17 upon the bolt 18 extending entirely through the reach and terminating at the exterior of the metal plates 9 and 10. At the opposite upper corners of the reach bar substantially rectangular excisions 19 are made in the wood member 5 for accommodating the reception of said ring members 17, said sockets thus formed having three metallic sides formed by the plates 9 and 10 as plainly shown in Fig. 4.

From the above description of the invention, the operation thereof is believed to be clear, such a construction is best adapted for use in connection with harvesting in which it becomes desirable to propel a loading machine, such as a hay loader in direct contact at the rear of the hay wagon to be loaded. In such a situation, the rear end of the present reach bar is employed for the attaching of the hay loader direct to the rear clamping clevis found upon the reach, while the forward clevis is used for direct connection with a chain passing beneath the tongue 20 of the vehicle to the whiffletree clevis of the lead team. This arrangement will direct the draft of the lead team to the hay loader through the agency of my improved reach and said chain and connector, thus relieving from the wagon the entire strain occasioned by the connecting up of the hay loader thereto although it will be obvious that the lead team will at times assist in drawing the wagon as well as the loader.

In the present construction it will be noted that the reach bar having opposite ends that are identical the same may be interchanged whenever desired when in use with the ordinary wagon so that either kingbolt eye may be employed. It will be further seen that the pivoting of the clevises 16 allows the same to normally assume the position shown in Fig. 3, thus hinged downwardly and being unobjectionable, while in actual use the same are brought to the position shown in Fig. 1 and in dotted lines in Fig. 3 at substantial alinement with the top of the reach bar.

While the forms of my invention herein shown and described are what are believed to be preferable embodiments thereof, the right is reserved to make slight changes and modifications therein as respects size, form, and minor details as shall not depart from the spirit and scope of the invention as set forth in the appended claims.

Having thus fully described my invention and in what manner the same is designed for use, what I claim as new and desire to secure by Letters Patent of the United States is:—

1. In a reversible wagon reach, a body member and side reinforcing members positioned thereon and formed of relatively harder material than said body member, said body member provided with longitudinal slots on two opposite sides thereof, said reinforcing members being of double channel form and provided with side flanges, said flanges engaging opposite sides of the body member, said reinforcing members provided with a longitudinal intermediate flange projecting in the same direction and parallel to said side flanges, said intermediate flange adapted to be received and secured within said slot.

2. A reversible wagon reach comprising an intermediate body member, and oppositely-arranged reinforcing members co-extensive therewith, said reinforcing members being formed of double channel bars, means for securing said bars to the body member, each end of said body member provided with oppositely-arranged sockets substantially rectangular in cross-section, a coupler clevis secured to each end of the reach, said clevises provided with suitable eyes and one eye thereof pivoted within each of said sockets.

3. A reversible wagon reach comprising a body member and oppositely-arranged reinforcing members secured thereto and co-extensive therewith, coupling clevises, each of said clevises provided with two terminal eyes, each end of said reach having two oppositely-arranged sockets, said reinforcing members forming three sides of each socket, a shaft extending centrally through said sockets and journaled in the opposite reinforcing members, said clevis eyes positioned within said sockets and said shaft passed through said eyes.

4. A reversible wagon reach comprising a body member and oppositely-arranged reinforcing strips secured to and embracing opposite sides thereof and of equal length therewith, said reinforcing members comprising metallic double channel bars, said body member provided with a longitudinal slot on two of its opposite sides, said slots receiving a portion of said bars, said body having a cut-away portion in its upper outer corners forming sockets, said reinforcing members providing three metallic walls for said sockets, a shaft extending through said sockets and a coupler clevis pivoted to said shaft.

5. A reversible wagon reach provided with similar opposite ends and sides, an intermediate wooden member substantially rectangular in cross-section and provided with a longitudinal slot on two opposite sides thereof, said slots alining with each other and positioned through the middle points of said sides, double channel bars provided with side flanges and an intermediate flange, said bars fitting said opposite sides of the wooden member and said central flange fitting one of said slots, said flanges provided with alining perforations therethrough, and securing means positioned through said perforations and contiguous portion of the wooden member.

6. A reversible wagon reach provided with similar opposite ends and sides, an intermediate wooden member substantially rectangular in cross-section and provided with a longitudinal slot on two opposite sides thereof, said slots alining with each other and positioned through the middle points of said sides, double channel bars provided with side flanges and an intermediate flange, said bars fitting said opposite sides of the wooden member and said central flange fitting one of said slots, said flanges provided with alining perforations therethrough, and securing means positioned through said perforations and contiguous portions of the wooden member, said wooden member provided at each end with a kingbolt eye and a pivoted coupler clevis.

7. A reversible wagon reach provided with similar opposite ends and sides, an intermediate wooden member substantially rectangular in cross-section and provided with a longitudinal slot on two opposite sides thereof, said slots alining with each other and positioned through the middle points of said sides, double channel bars provided with side flanges and an intermediate flange, said bars fitting said opposite sides of the wooden member and said central flange fitting one of said slots, said flanges provided with alining perforations therethrough, and securing means positioned through said perforations and contiguous portions of the wooden member, said wooden member provided at each end with a kingbolt eye, and with oppositely-arranged sockets, the flanges of said bars forming three metallic sides for all of said sockets, a shaft extending through said sockets and secured at opposite sides of the reach to said bars, and a coupler clevis pivoted in said sockets to said shaft.

In testimony whereof I affix my signature in the presence of two witnesses.

CYRUS C. CLARK.

Witnesses:
GEORGE K. BARROW,
A. E. KNAP.